UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VULCANIZED CAOUTCHOUC-LIKE SUBSTANCE.

1,084,335.  Specification of Letters Patent.  Patented Jan. 13, 1914.

No Drawing.   Application filed March 20, 1911.  Serial No. 615,665.

*To all whom it may concern:*

Be it known that we, FRITZ HOFMANN, CARL COUTELLE, KONRAD DELBRÜCK, and KURT MEISENBURG, doctors of philosophy, chemists, citizens of the German Empire, residing at Elberfeld, Germany, have invented new and useful Improvements in Vulcanized Caoutchouc-like Substances, of which the following is a specification.

By our application Ser. No. 588173 the production of new caoutchouc like substances is described, which are obtained by polymerizing hydrocarbons of the series:

in which at least 2 atoms of H are substituted by methyl-groups, for example:

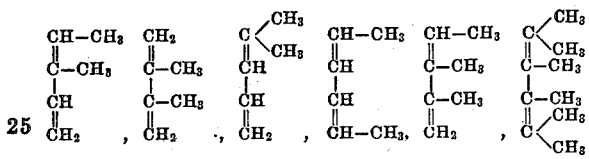

It has now been found that these caoutchouc like substances can be vulcanized, substances being obtained equal to and some even better than vulcanized natural caoutchouc. These facts could not be foreseen in the existent state of knowledge with regard to the nature and the processes during the vulcanizing of caoutchouc. One could not know if the new caoutchouc-like substances too would show the same behavior to vulcanizing agents as the natural caoutchouc does. Still less could one predict, whether the vulcanized products, if they could be obtained at all, would have the same valuable properties of vulcanized caoutchouc.

In order to illustrate our invention the following examples are given, the parts being by weight:—

Example 1: 5 parts of the caoutchouc like substance obtained by the polymerization of beta-gamma-dimethylerythrene are dissolved in 100 parts of benzene. A solution of one part of surfur mono-chlorid ($S_2Cl_2$) in 50 parts of carbon disulfid $CS_2$ is added and the mixture is allowed to stand for 1.5 to 2 minutes, and is then poured into alcohol. On stirring a substance separates which is distinguished from the parent material by being of greater toughness and of better resistance to different agents. It is grayish in color and not adhesive.

Example 2: 50 parts of the caoutchouc like substance obtained by polymerization of beta-gamma-dimethylerythrene are intimately mixed by means of mixing rolls with 15 parts of powdered sulfur. The product shaped from the resulting sheet is then heated in a suitable apparatus for from 5 to 6 hours at 150–160° C.

Example 3. 100 parts of the product of polymerization obtained from tetramethylerythrene are carefully worked together with 10 parts of sublimed sulfur in a mixing apparatus provided with rolls until a homogeneous mass results. The resulting product is brought into the desired shape and is then subjected in an iron vulcanizing vessel to the action of steam under a pressure of 3–4 atmospheres. After from 1 to 2 hours the process is complete.

Instead of the products of polymerization used in the examples a mixture of the caoutchouc like product obtained from the hydrocarbons mentioned with natural caoutchouc can be used; similarly other methods in use for vulcanization can also be employed.

The novel vulcanized caoutchouc substances of the present invention form ozonids which upon decomposition with water yield poly-methyl-substituted derivatives (aldehydes or ketones) of succinic aldehyde,

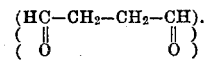

Thus the vulcanized caoutchouc substance made from beta-gamma-dimethylerythrene caoutchouc by vulcanization yields among the decomposition products of its ozonid with water acetonylacetone.

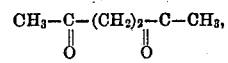

or the 1.4-dimethyl derivative of succinic aldehyde. Vulcanized mixtures of the novel caoutchouc substances with natural caoutchouc in addition yield levulinic derivatives, particularly levulinic aldehyde, the 1-methyl derivative of succinic aldehyde,

We claim:—

1. As a new product a vulcanized caoutchouc-like substance comprising the vulcanized caoutchouc-like polymerization product of a poly-substituted erythrene hydrocarbon being a grayish non-adhesive substance containing sulfur and forming ozonids which upon decomposition with water yield poly-substituted derivatives of succinic aldehyde.

2. As a new product a vulcanized caoutchouc-like substance comprising the vulcanized caoutchouc-like polymerization product of a poly-methyl-substituted erythrene hydrocarbon being a grayish non-adhesive substance containing sulfur and forming ozonids which upon decomposition with water yield poly-methyl substituted derivatives of succinic aldehyde.

3. As a new product a vulcanized caoutchouc-like substance comprising the vulcanized caoutchouc-like polymerization product of a beta-gamma-substituted erythrene hydrocarbon being a grayish non-adhesive substance containing sulfur and forming ozonids which upon decomposition with water yield disubstituted derivatives of succinic aldehyde.

4. As a new product a vulcanized caoutchouc-like substance comprising the vulcanized caoutchouc-like polymerization product of a dimethyl-erythrene hydrocarbon being a grayish non-adhesive substance containing sulfur and forming ozonids which upon decomposition with water yield dimethyl substituted derivatives of succinic aldehyde.

5. As a new product a vulcanized caoutchouc-like substance comprising the vulcanized caoutchouc-like polymerization product of beta-gamma-dimethyl-erythrene being a grayish non-adhesive substance containing sulfur and forming ozonids which upon decomposition with water yield acetonylacetone.

6. As a new product a vulcanized caoutchouc-like substance comprising a vulcanized mixture of natural caoutchouc and the caoutchouc-like polymerization product of a poly-substituted erythrene hydrocarbon being a grayish non-adhesive substance containing sulfur and forming ozonids which upon decomposition with water yield levulinic aldehyde and poly-substituted derivatives of succinic aldehyde.

7. As a new product a vulcanized caoutchouc-like substance comprising a vulcanized mixture of natural caoutchouc and the caoutchouc-like polymerization product of a poly-methyl-substituted erythrene hydrocarbon being a grayish non-adhesive substance containing sulfur and forming ozonids which upon decomposition with water yield levulinic aldehyde and poly-methyl-substituted derivatives of succinic aldehyde.

8. As a new product a vulcanized caoutchouc-like substance comprising a vulcanized mixture of natural caoutchouc and the caoutchouc-like polymerization product of a beta-gamma-substituted erythrene hydrocarbon being a grayish non-adhesive substance containing sulfur and forming ozonids which upon decomposition with water yield levulinic aldehyde and di-substituted derivatives of succinic aldehyde.

9. As a new product a vulcanized caoutchouc-like substance comprising a vulcanized mixture of natural caoutchouc and the caoutchouc-like polymerization product of a di-methyl-substituted erythrene hydrocarbon being a grayish non-adhesive substance containing sulfur and forming ozonids which upon decomposition with water yield levulinic aldehyde and dimethyl-substituted derivatives of succinic aldehyde.

10. As a new product a vulcanized caoutchouc-like substance comprising a vulcanized mixture of natural caoutchouc and the caoutchouc-like polymerization product of beta-gamma-dimethyl erythrene being a grayish non-adhesive substance containing sulfur and forming ozonids which upon decomposition with water yield levulinic aldehyde and acetonylacetone.

In testimony whereof we have hereunto set our hands in the presence of two subscribing witnesses.

FRITZ HOFMANN. [L. S.]
CARL COUTELLE. [L. S.]
KONRAD DELBRÜCK. [L. S.]
KURT MEISENBURG. [L. S.]

Witnesses:
 CHAS. J. WRIGHT,
 ALFRED HENKEL.

Correction in Letters Patent No. 1,084,335.

It is hereby certified that in Letters Patent No. 1,084,335, granted January 13, 1914, upon the application of Fritz Hofmann, Carl Coutelle, Konrad Delbrück, and Kurt Meisenburg, of Elberfeld, Germany, for an improvement in "Vulcanized Caoutchouc-Like Substances" an error appears in the printed specification requiring correction as follows: Page 1, lines 98 to 100, for the formula

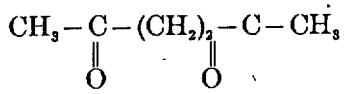

read

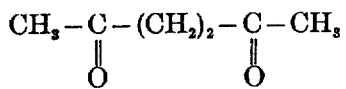

and that the said Letters Patent should be read with this correction therein that the same may conform to the record of the case in the Patent Office.

Signed and sealed this 31st day of March, A. D., 1914.

[SEAL.]

J. T. NEWTON,
*Acting Commissioner of Patents.*